US000001908H

United States Statutory Invention Registration [19]

[11] Reg. Number: H1,908

[45] Published: Nov. 7, 2000

Kelley et al.

[54] LEVER BANK FOR HEAVY VEHICLE

[75] Inventors: Craig B. Kelley, Dunlap; Daniel E. Shearer; Susan M. Boast, both of Metamora, all of Ill.

[73] Assignee: Caterpillar Inc., Peoria, Ill.

[21] Appl. No.: 09/216,659

[22] Filed: Dec. 18, 1998

[51] Int. Cl.[7] ..... G05G 1/10

[52] U.S. Cl. ..... 74/343; 74/523

[56] References Cited

U.S. PATENT DOCUMENTS

| | | | |
|---|---|---|---|
| D. 281,409 | 11/1985 | Cambria | D12/179 |
| 3,492,889 | 2/1970 | Hauff . | |
| 3,675,880 | 7/1972 | Koch | 244/83 R |
| 3,701,288 | 10/1972 | Jordan | 74/471 XY |
| 3,972,249 | 8/1976 | Hansen | 74/526 |
| 4,664,221 | 5/1987 | Loney et al. | 180/315 |
| 4,938,091 | 7/1990 | Waggoner et al. | 74/741 XY |
| 5,529,134 | 6/1996 | Yomogita | 180/6.2 |

*Primary Examiner*—Harold J. Tudor

*Attorney, Agent, or Firm*—Kevin M. Kercher

[57] ABSTRACT

A lever bank for implement controls on large construction or agricultural vehicles has a "home" position for operation of the levers. One of the levers has a handle which is larger than the handles of the other levers. This large handle provides a rest position for the operator such that the operator will know the location of the other handles relative to this one handle. The operator may thus rest a hand on this one lever, and know where the other levers are relative to the one lever without looking away from the direction of movement of the vehicle. This simplifies operation of the vehicle.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LEVER BANK FOR HEAVY VEHICLE

TECHNICAL FIELD

This invention relates to improvements in the lever banks which are often incorporated into heavy vehicles, such as construction or agricultural vehicles having implements for performing work.

BACKGROUND ART

Currently, heavy vehicles are provided with machine functions and implement functions. The machine functions would include functions relating to moving the vehicle. These functions include steering, propulsion, etc. Many heavy vehicles for construction or agriculture carry an implement, and the implements are becoming very sophisticated, with additional controls and functions for controlling the implement.

As an example, on a road grader, there are typically eight implement functions. On some road graders, there could be even more. The implement functions are typically provided by pivotable levers which are mounted in banks. As an example, on each side of the driver console there is typically a lever bank including at least four levers. In systems with more functions, there are additional levers.

The implement functions are often actuated while the vehicle is moving. An operator may be required to look away from the driving direction to reach a particular lever, which is somewhat undesirable. In the prior art, operators may often be utilizing several of the implement levers within a short period of time, and often must switch back and forth between the levers. If an operator attempts to shift back and forth without removing vision from the direction of travel, the operator may sometimes accidentally grab the wrong lever. This is, of course, undesirable.

DISCLOSURE OF THE INVENTION

In a disclosed embodiment of this invention, a lever bank is provided with a first lever having a unique shape relative to the other levers in the lever bank. In this way, the operator is able to grasp this lever as a "home" position. The operator will know how to move to reach each of the other levers from this home lever.

In a preferred embodiment of this invention, the "home" lever is mounted with a plurality of other levers in a first row. The levers all control implement functions. Additional levers may be provided in a second row and are pivotable about an axis parallel to the axis of the first row. More preferably, the "home " lever has an enlarged handle relative to the other levers in both parallel and perpendicular directions relative to the axis of rotation. This makes the home lever a comfortable position for resting the operator's hand.

These and other features of the present invention can be best understood from the following specification and drawings, the following of which is a brief description.

BEST MODE FOR CARRYING OUT THE INVENTION

Figure 1:
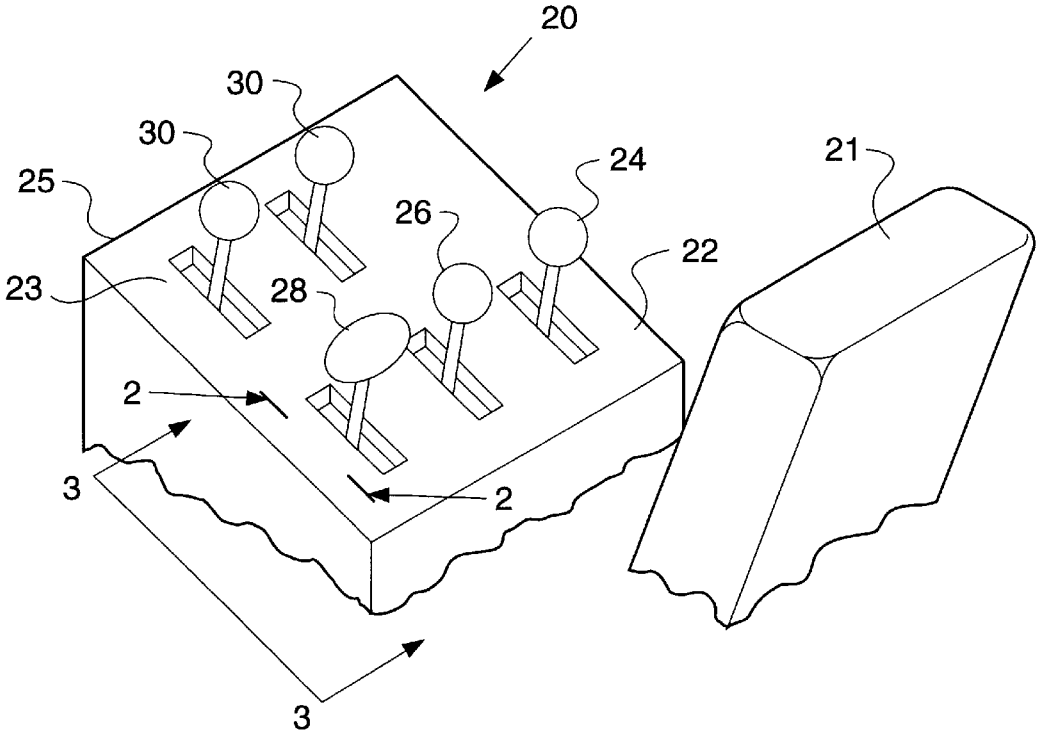
FIG. 1 is a schematic view showing a lever bank.
Figure 3:
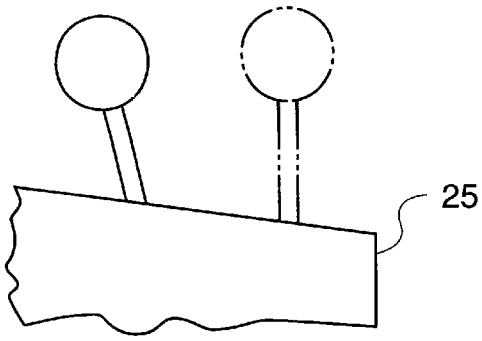
FIG. 3 is a side view along the 3—3 axis as shown in FIG. 1.

A lever bank 20 is illustrated in FIG. 1. An operator's seat 21 is shown to the right of lever bank 20. Typically, a second lever bank may be placed on an opposed side of seat 21. A first row 22 of levers is spaced rearwardly from a second row 23 of levers. Each of the levers in the lever bank control implement functions. That is, the levers control implement 25, shown in FIG. 3.I n a standard road grader, there are at least eight levers, with four mounted in lever banks on each side of the operator console.

As shown in FIG. 1, the first row 22 includes a lever 24 and 26 having a small handle. A third lever 28 has an enlarged handle and in the preferred embodiment, an ergonomically contoured surface. This is the "home " lever. Levers 24, 26 and 28 all pivot about a common axis. A pair of second levers 30 is mounted in the second row 23. The levers 30 also have the smaller handle, and pivot about a second axis which is illustrated parallel to the first axis.

Figure 2:
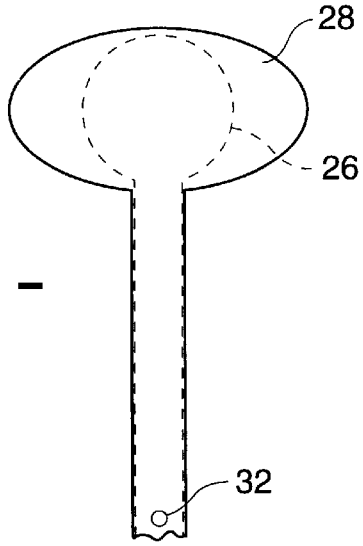
FIG. 2 is a view along line 2—2 as shown in FIG. 1.

As can be appreciated from FIGS. 1 and 2, lever 28 has an enlarged surface relative to the other handles, both parallel to and perpendicular to the axis 32 for pivoting the lever 28. That is, the handle for the lever 28 is enlarged relative to the handle 26 in both dimensions. This provides a comfortable rest position for the lever 28.

The levers 24, 26, 28 and 30 all control implements functions. On a road grader, the functions controlled by the levers may include functions such as lift, blade tip, side shift, circle drive, etc. Of course, the lever bank can include other optional features, and the invention is not limited to any particular function for any one of the levers, including the home lever. That is, these levers control some non-driving feature for the vehicle incorporating the lever bank 20. Generally, the present invention relates to the use of an enlarged handle in an implement lever bank.

Industrial Applicability

The enlarged implement lever 28 of the present invention provides a quick, easy, ergonomic reference for an operator's hand. The operator can quickly locate all adjacent levers by placing his or her hand in the "home position" on top of lever 28. This permits the operator to operate the lever 28 and adjacent levers 24, 26 and 30 without having to visually locate them and to have an ergonomically contoured rest for the operator's hand. Although a preferred embodiment of this invention has been disclosed, a worker of ordinary skill in this art would recognize that certain modifications come within the scope of this invention. For that reason, the following claims should be studied to determine the true scope and content of this invention.

We claim:

1. A lever bank for a vehicle comprising:

a plurality of levers, each of said levers being operable to control a function of an implement associated with a vehicle, each of said levers having a handle at an upper end, and one handle associated with one of said levers having a shape which is distinct from said handles of the other of said levers in said lever bank, said handles of said other said levers being generally similar in shape, such that an operator will be able to grasp said one handle and provide a home position for operation of said lever bank.

2. A lever bank as recited in claim 1, wherein said one handle has an enlarged surface area compared to said handles associated with the others of said levers.

3. A lever bank as recited in claim 2, wherein at least some of said plurality of levers are pivotable about a common axis, and said one lever is pivotable on said common axis.

4. A lever bank as recited in claim 3, wherein said handle of said one lever is enlarged relative to the handles of said other levers in both a dimension parallel to said axis and in a dimension perpendicular to said axis.

5. A lever bank for a vehicle comprising:

a first row including a plurality of levers, each of said plurality of levers being operable to control an implement associated with a vehicle;

a second row including at least one lever, levers in said first row all being pivotable about a first axis, and said at least one lever in said second row being pivotable about an axis which is parallel to said first axis; and each of said levers including a handle, said handle associated with at least one lever in said first row having an enlarged surface area compared with said handles of said other levers such that an operator will be able to find and grasp said handle of said at least one lever to define a home position.

6. A lever bank as recited in claim 5, wherein said handle of said one lever is enlarged relative to the handles of said other levers in both a dimension parallel to said axis and in a dimension perpendicular to said axis.

7. A lever bank as recited in claim 5, wherein said handles of said other levers being generally similar in shape.

* * * * *